United States Patent
Bashyam et al.

(10) Patent No.: US 9,449,014 B2
(45) Date of Patent: Sep. 20, 2016

(54) RESYNCHRONIZATION OF REPLICATED DATA

(75) Inventors: Murali Bashyam, Fremont, CA (US); Sreekanth Garigala, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/306,878

(22) Filed: Nov. 29, 2011

(65) Prior Publication Data

US 2013/0138607 A1    May 30, 2013

(51) Int. Cl.
| | |
|---|---|
| G06F 7/00 | (2006.01) |
| G06F 17/00 | (2006.01) |
| G06F 17/30 | (2006.01) |
| G06F 13/14 | (2006.01) |

(52) U.S. Cl.
CPC ............................. *G06F 17/30174* (2013.01)

(58) Field of Classification Search
CPC ........... G06F 11/2082; G06F 11/2076; G06F 17/30174; G06F 3/065; G06F 11/1658; G06F 11/1469
USPC .................. 707/809, 609, 737, 747, E17.01, 707/999.202, 999.204, 610, E17.052, 698; 370/216–217; 711/170, 216, 162; 713/156, 170, 171, 180; 706/41; 709/203; 710/74; 714/20, E11.102, 714/E11.118, 4.11, 6.3
See application file for complete search history.

(56) References Cited

U.S. PATENT DOCUMENTS

| | | | | |
|---|---|---|---|---|
| 2008/0222159 | A1* | 9/2008 | Aranha | G06F 17/30289 |
| 2008/0270629 | A1* | 10/2008 | Yang | H04M 3/42 709/248 |
| 2011/0258161 | A1* | 10/2011 | Constantinescu | G06F 11/1453 707/640 |

OTHER PUBLICATIONS

"EMC Data Domain Replicator: A Detailed Review", White Paper, Retrieved from Internet <http://www.emc.com/collateral/software/white-papers/h7082-data-domain-replicator-wp.pdf>, Apr. 2013, 24 pgs.
Reisner, Philipp , "Rapid resynchronization for replicated storage Activity-logging for DRBD", Retrieved from Internet <http://www.drbd.org/fileadmin/drbd/publications/drbd-activity-logging_v6.pdf>, Jan. 27, 2004, 5 pgs.
Tridgell, Andrew , "Efficient Algorithms for Sorting and Synchronization", Australian National University, 1999, 115 pgs.

* cited by examiner

*Primary Examiner* — Usmaan Saeed
*Assistant Examiner* — Cecile Vo
(74) *Attorney, Agent, or Firm* — Kwan & Olynick LLP

(57) ABSTRACT

Mechanisms are provided for efficient resynchronization of replicated data. A hash value is generated for a chunk of data replicated from a source node to a target node. The chunk of data may be a file deduplicated and compressed at both a source node and a target node. A current sequence number is determined and a sequence number and hash tuple is maintained for the chunk of data at both the source node and the target node. Sequence numbers are modified whenever the data is modified. Current sequence numbers and sequence number and hash values in the sequence number hash tuples at the source node and the target node may be compared to determine whether data is still synchronized at a later point in time or whether data requires resynchronization.

20 Claims, 6 Drawing Sheets

Figure 2A

| Object Map File X 201 | | |
|---|---|---|
| Offset 203 | Index 205 | Lname 207 |
| 0K | 0.1 | NULL |
| 8K | 0.2 | NULL |
| 16K | 0.3 | NULL |

| Sequence Number 221 | Hash Value 223 |
|---|---|

Figure 2B

| Datastore Suitcase 271 | | |
|---|---|---|
| | Data Table 251 | |
| Index 253 | Data Offset 255 | Data Reference Count 257 |
| 1 | Offset-Data Chunk A | 1 |
| 2 | Offset-Data Chunk B | 1 |
| 3 | Offset-Data Chunk C | 1 |
| | Datastore | |
| | Data 261 | Last File 263 |
| 1 | Data Chunk A | File X 201 |
| 2 | Data Chunk B | File X 201 |
| 3 | Data Chunk C | File X 201 |

Figure 3

| Dictionary 301 ||
|---|---|
| Fingerprint 311 | Storage Location 321 |
| a | Location 323 |
| b | Location 325 |
| c | Location 327 |

| Dictionary 351 ||
|---|---|
| Fingerprint 361 | Storage Location 371 |
| i | Location 373 |
| j | Location 375 |
| k | Location 377 |

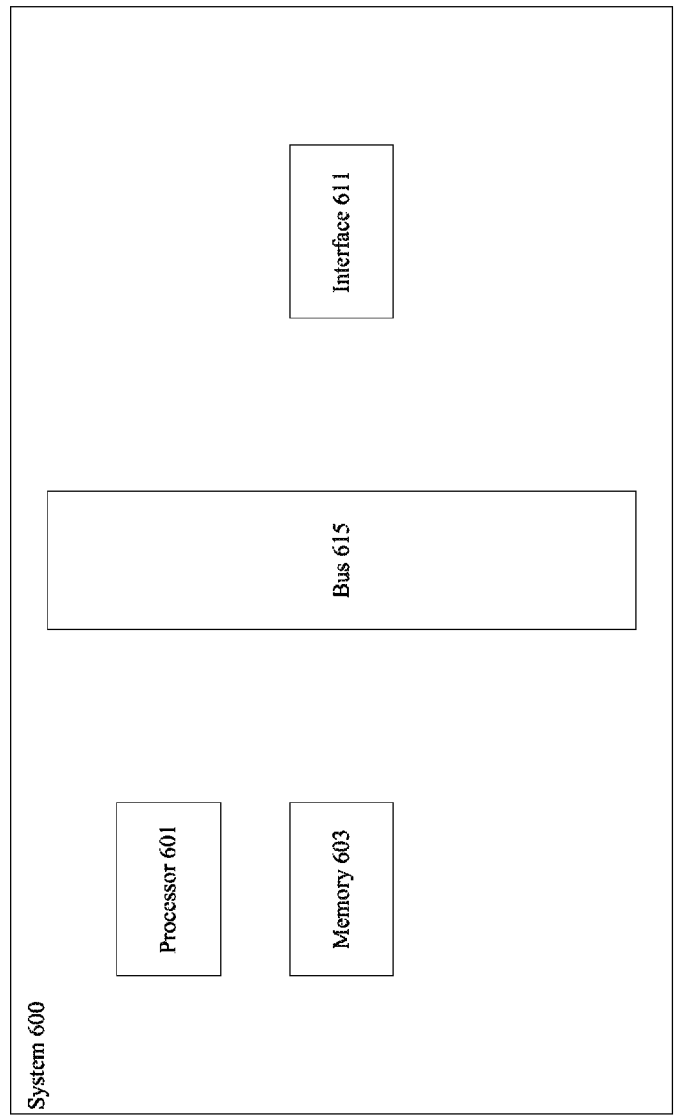

RESYNCHRONIZATION OF REPLICATED DATA

TECHNICAL FIELD

The present disclosure relates to resynchronization of replicated data.

DESCRIPTION OF RELATED ART

Data replication occurs in a variety of network environments to provide for improved redundancy, content distribution, disaster recovery capabilities, and off host data processing. In some instances, data is copied from a host to a target. The data may be copied periodically to reflect changes in data at the host. However, re-copying data from the host to the target can be wasteful, as large segments of data at a host may not have changed. In other instances, changes in data at the host are also applied to data at the target. However, for a variety of reasons, data at the target may fall out of synchronization with data at the host.

For example, there may be a network outage, the target may be offline, or there may be planned processing of the data at the target. In these circumstances, data at the target may no longer correspond to data at the host. Data at the target may have to be resynchronized with data at the source. In most applications involving replication, resynchronization is important and periodically required.

Conventional resynchronization programs traverse all directories and compute hashes/checksums for segments of data at a host and compare these segments with segments of data at the target. However, these conventional resynchronization programs are extremely resource intensive, and may consume valuable processing and network resources. Conventional resynchronization processes can last hours or days for large replicated data sets.

Consequently, it is beneficial to provide improved mechanisms for resynchronizing replicated data, particularly optimized replicated data.

BRIEF DESCRIPTION OF THE DRAWINGS

The disclosure may best be understood by reference to the following description taken in conjunction with the accompanying drawings, which illustrate particular embodiments of the present invention.

FIG. 2A illustrates a particular example of an object map.

FIG. 2B illustrates a particular example of a datastore suitcase.

FIG. 3 illustrates a particular example of a dictionary.

FIG. 6 illustrates a particular example of a computer system.

DESCRIPTION OF PARTICULAR EMBODIMENTS

Figure 1:
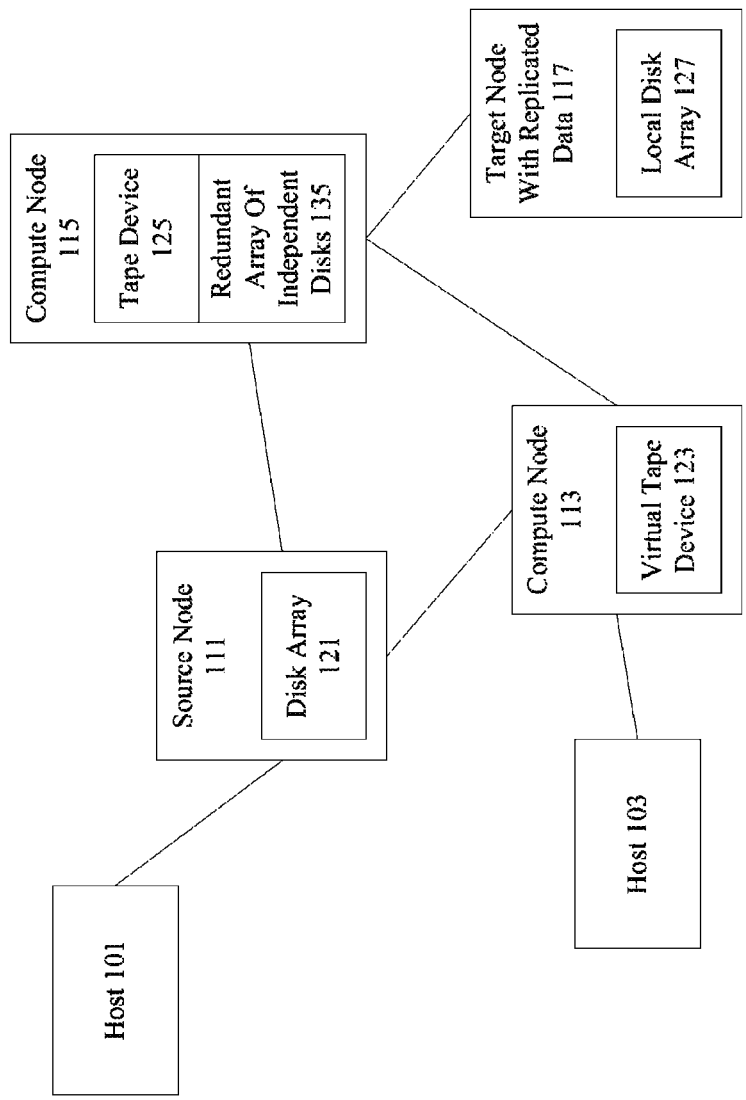
FIG. 1 illustrates a particular example of a system that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of optimized data. However, it should be noted that the techniques and mechanisms of the present invention apply to a variety of different types of data. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for efficient resynchronization of replicated data. A hash value is generated for a chunk of data replicated from a source node to a target node. The chunk of data may be a file deduplicated and compressed at both a source node and a target node. A current sequence number is determined and a sequence number and hash tuple is maintained for the chunk of data at both the source node and the target node. Sequence numbers are modified whenever the data is modified. Current sequence numbers and sequence number and hash values in the sequence number hash tuples at the source node and the target node may be compared to determine whether data is still synchronized at a later point in time or whether data requires resynchronization.

Example Embodiments

Data replication is used in a variety of systems to enhance redundancy and data availability, allow for disaster recovery, distribute processing loads, and provide for geographic separation. However, data replication can also introduce complexity into a system. Data at source needs to be synchronized with data at a target. In some instances where data sets are relatively small, the full data set can be periodically copied from the source to the target. However, in most instances, performing a periodic full copy of the data from the source to the destination is wasteful of processing and network resources.

In most instances, replicated systems try to keep data in synchronization by using a journaling and/or logging system that will only commit changes to data at a source when changes to data can also be committed at a target. Nonetheless, data still can fall out of synchronization. For example, a target may be offline for an extended period of time, network links may be down, data may be corrupted, alternate processing of data at a target may be performed, etc. In circumstances such as these, it may be necessary to resynchronize the data.

Conventional resynchronization mechanisms involve traversing directories and generating hashes for regions of data at a source and regions of data at a target and performing comparisons. However, conventional resynchronization mechanisms are very time consuming and may take days for large sets of data. Consequently, the techniques of the present invention provide improved mechanisms for resynchronizing data. According to various embodiments, there is no longer a need to read all of the replicated data at a source or target during resynchronization, allowing full resynchronization to occur in a fraction of the time required by conventional resynchronization mechanisms.

According to various embodiments, a determination can be made as to whether data at a target node is out-of-sync with that at a source node without having to read all of the data at the target node. In particular embodiments, sequence numbers are maintained for particular files or blocks. Every modification to the file data modifies or increments the sequence number. According to various embodiments, the sequence number is maintained alongside file data as an extended attribute. In some instances, the sequence number is maintained as metadata or included in an object map or datastore suitcase.

According to various embodiments, a replication system maintains a sequence number and a hash of the data for the last time a file was synchronized at both a source and a target. The replication system also maintains a current sequence for the file which is updated on every modification, such as a write access, truncate, or append. In particular embodiments, a hash is also generated when file data is replicated. During replication, the hash along with the current sequence number are stored in extended attribute fields associated with a file at the source. The hash and sequence number are also sent to the target and stored in extended attribute fields associated with the file at the target as well.

When a resynchronization is needed, e.g. following a link failure, disk error, etc., the replication system determines whether the data is currently synchronized. In particular embodiments, if the current sequence number associated with the file at the source does not match the sequence number stored in extended attribute fields associated with the file at the source, the file is declared to be out-of-sync since there have been modifications made to the file after the last sync. The current sequence number associated with the file at the target is also checked to determine if the file at the target has been modified since the last sync. If the sequence numbers are consistent, the hash tuple, or the hash sequence number pairing at the source node is compared to the hash tuple on the target node. If the hash tuples match, the files are declared to be in sync. According to various embodiments, the hash matching will identify out of sync data that occurs when two arbitrary nodes are added as a replication pair with sequence numbers that happen to match.

After a file is successfully replicated, e.g. during resynchronization, the hash tuple, e.g. the hash, sequence number tuple on the source as well as on the target are updated. The sequence number is updated to the current sequence number. The hash is updated to the new hash calculated during replication in the pass over the source. According to various embodiments, the hash is calculated while the source is being copied to the destination to allow a single pass operation to be used for both hash calculation and replication.

In particular embodiments, resynchronization is performed using the following pseudocode:

```
is_data_insync( )
begin
if ( primary.hashtuple.seqnum == primary.current_seqnum
&&secondary.hashtuple.seqnum == secondary.current_seqnum &&
primary.hashtuple.hash == secondary.hashtuple.hash && primary.
hashtuple.seqnum == secondary.hashtuple.seqnum)
begin return in-sync;
end
return out-of-sync;
end
```

According to various embodiments, checking current sequence numbers against stored sequence numbers allows determination of whether any modifications have been made since the last replication. Checking sequence number and hash tuples assures that even if sequence numbers happen to match in source and target nodes, data consistency is provided. Updates of hash and sequence numbers can also be performed efficiently.

According to various embodiments, a variety of source and target resynchronization work flows are supported. In some examples of primary and second node redundancy and recovery, a source or primary node may go offline. The target or secondary node will become active. Data can be resynchronized to the original source or primary node when the source node reactivates. In other examples, two nodes with arbitrary data can be added in replication and can be synchronized efficiently. In still other examples, nodes can lose contact because of a down link or network connection and can subsequently reestablish a replication relation and transfer only modified files.

FIG. 1 illustrates one example of a system that can use the techniques of the present invention. Hosts 101 and 103 are connected to compute nodes 111, 113, and 115 as well as scale out node 117. According to various embodiments, compute node 111 is a source node or primary node. Compute node 117 is a target node or secondary node. It should be noted that target node 117 may be configured in the same manner as any compute node 111, 113, and 115. However, to provide for redundancy, geographic distribution, load sharing, etc., data at source node 111 is replicated to target node 117. In particular embodiments, target node 117 may have been added to a network already including compute nodes 111, 113, and 115. According to various embodiments, various compute nodes in a network may be configured as active or passive resources. In particular embodiments, source node 111 includes a locally attached disk array 121. Compute node 113 includes a virtual tape device 123. Compute node 115 includes a tape device 125 as well as a redundant array of independent disks (RAID) 135. Target node 117 includes disk array 127. Each of the compute nodes 111, 113, 115, and 117 includes locally connected storage resources that may need to be globally accessible.

Hosts 101 and 103 may include computer systems, application servers, devices, etc. A network connecting the hosts and compute nodes may be a single network or a combination of different networks. According to various embodiments, each host 101 and 103 runs applications that may require accessing storage capabilities of compute nodes 111, 113, 115, and 117.

According to various embodiments, hosts 101 and 103 may be connected to compute nodes 111, 113, 115, and 117 using file level protocols such as Server Message Block (SMB), Network File System (NFS), or the Andrew File System (AFS) that are capable of providing network attached storage (NAS) to heterogeneous clients. In particular examples, NAS includes both a file system and storage. SMB, NFS, and AFS generally allow hosts 101 and 103 access data at the file level. The compute nodes 111, 113, 115, and 117 then use block level protocols such as serial advanced technology attachment (SATA), Internet Small Computer Systems Interface (iSCSI), and storage area networks (SANs) to access individual blocks of data.

Block level protocols generally do not provide any file system capabilities to file servers but instead leave file system operations on the compute node side. The data accessed by the compute out nodes 111, 113, 115, and 117 may be physically stored on attached storage 121, 123, 125, 127, and 135.

According to various embodiments, a hashing mechanism may be implemented at a source node 111. The hashing mechanism generates identifiers such as hashes or checksums of chunks of data. The chunks may be entire files, fixed size segments, variable size segments, etc. Chunk sizes and boundaries may be determined using a variety of available mechanisms. According to various embodiments, a source node 111 determines a hash or data fingerprint and maintains a sequence number when a chunk or file was last synchronized with data at the target node 117.

The sequence number is updated every time a modification such as write or truncate is performed on the chunk at the source node 111. In particular embodiments, the sequence number and hash are maintained in extended attributes associated with the chunk at the source node. The sequence number and hash tuple are also transmitted to the target node 117 and stored at the target node 117 using extended attributes associated with the chunk at the target node. It should be noted that in some instances, the sequence number and hash tuple are node stored as extended attributes but are maintained using some other mechanism, such as a separate table or data structure.

FIG. 2A illustrates a particular example of a mechanism for maintaining data chunks. FIG. 2B illustrates a particular example of a mechanism for managing data chunks. It should be noted that although a particular mechanism is described, a wide variety of mechanisms can be used. According to various embodiments, object map file X 201 includes offset 203, index 205, and lname 207 fields. In particular embodiments, each chunk in the object map for file X is 8K in size. In particular embodiments, each data chunk has an index of format <Datastore Suitcase ID>. <Data Table Index>. For example, 0.1 corresponds to suitcase ID 0 and datatable index 1, while 2.3 corresponds to suitcase ID 2 and database index 3. The chunks corresponding to offsets 0K, 8K, and 16K all reside in suitcase ID 0 while the data table indices are 1, 2, and 3. The lname field 207 is NULL in the object map because each chunk has not previously been referenced by any file. According to various embodiments, each chunk or file has extended attributes including a sequence number 221 and a hash 223. In some examples, each chunk is a portion of a file, and each file maintains multiple sequence numbers and hash values for the multiple chunks.

FIG. 2B illustrates one example of a datastore suitcase corresponding to the object map file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section.

According to various embodiments, datastore suitcase 251 includes three offset reference count pairs which map to the data chunks of the object map file X 201. In the index portion, index 1 corresponding to data in offset-data chunk A has been referenced once. Index 2 corresponding to data in offset-data chunk B has been referenced once. Index 3 corresponding to data in offset-data chunk C has been referenced once. In the data portion, index 1 includes data chunk A and a reference to File X 201 which was last to place a reference on the data chunk A. Index 2 includes data chunk B and a reference to File X 201 which was last to place a reference on the data chunk B. Index 3 includes data chunk C and a reference to File X 201 which was last to place a reference on the data chunk C.

FIG. 3 illustrates multiple dictionaries assigned to different fingerprints. According to various embodiments, the fingerprints values are checksums, SHA/SHA1/SHA-256 hash values. In particular embodiments, dictionary 301 is a deduplication dictionary used by a first node and includes fingerprint ranges from 0x0000 0000 0000 0000-0x0000 0000 FFFF FFFF. Dictionary 351 is used by a second node and includes fingerprint ranges from 0x0000 0001 0000 0000-0X0000 0001 FFFF FFFF. Fingerprints 311 within the range for dictionary 301 are represented by symbols a, b, and c for simplicity. Fingerprints 361 within the range for dictionary 351 are represented by symbols i, j, and k for simplicity. According to various embodiments, each fingerprint in dictionary 301 is mapped to a particular storage location 321 such as location 323, 325, or 327. Each fingerprint in dictionary 351 is mapped to a particular storage location 371 such as location 373, 375, and 377.

Having numerous small chunks increases the likelihood that duplicates will be found. However, having numerous small chunks decreases the efficiency of using the dictionary itself as well as the efficiency of using associated object maps and datastore suitcases.

Figure 4:
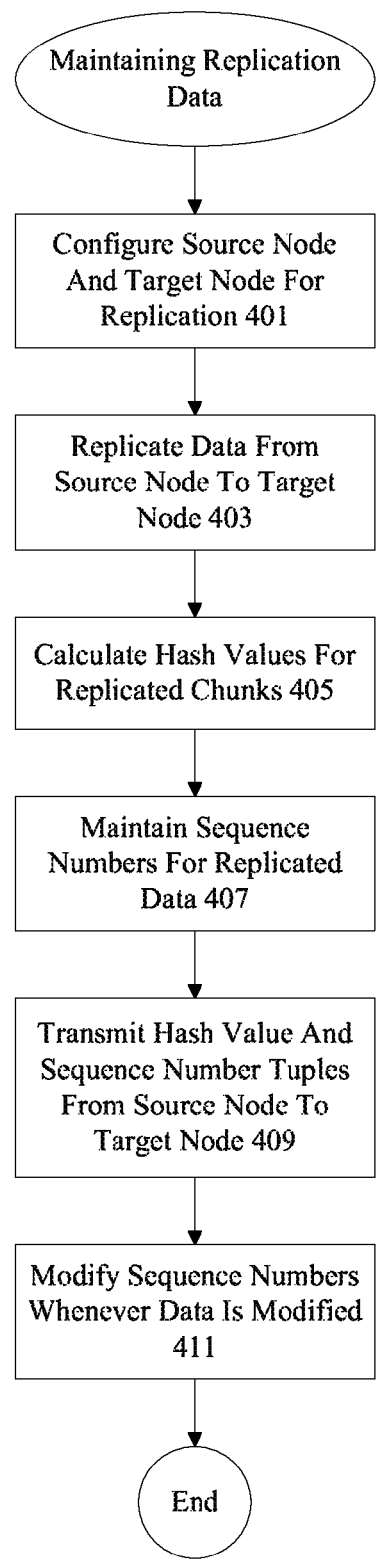
FIG. 4 illustrates a particular example of a technique for performing optimized data resynchronization.

FIG. 4 illustrates a particular example of a technique for maintaining sequence number and hash tuples. According to various embodiments, a source node and a target node are configured for replicated operation at 401. Replicated operation may entail a source node operating as a primary or active node while a target node operates as a secondary or standby node. Alternatively, both may simultaneously be active. At 403, data is replicated from the source node to the target node. At 405, hash values are calculated for chunks replicated from the source node to the target node. At 407, sequence numbers are maintained for replicated data. According to various embodiments, hash values may be calculated in a single pass as data is deduplicated for storage and redundancy at a source node and a target node. The hash values used for deduplication may also be used for replication synchronization. In particular embodiments, hash values are calculated for entire files. At 409, hash value and sequence number tuples are transmitted from the source node to the target node and maintained at both the source node and the target node. In particular embodiments, the hash value and sequence number tuples are maintained as extended attributes associated with a file. According to various embodiments, sequence numbers are updated at 411 every time data is modified.

Figure 5:
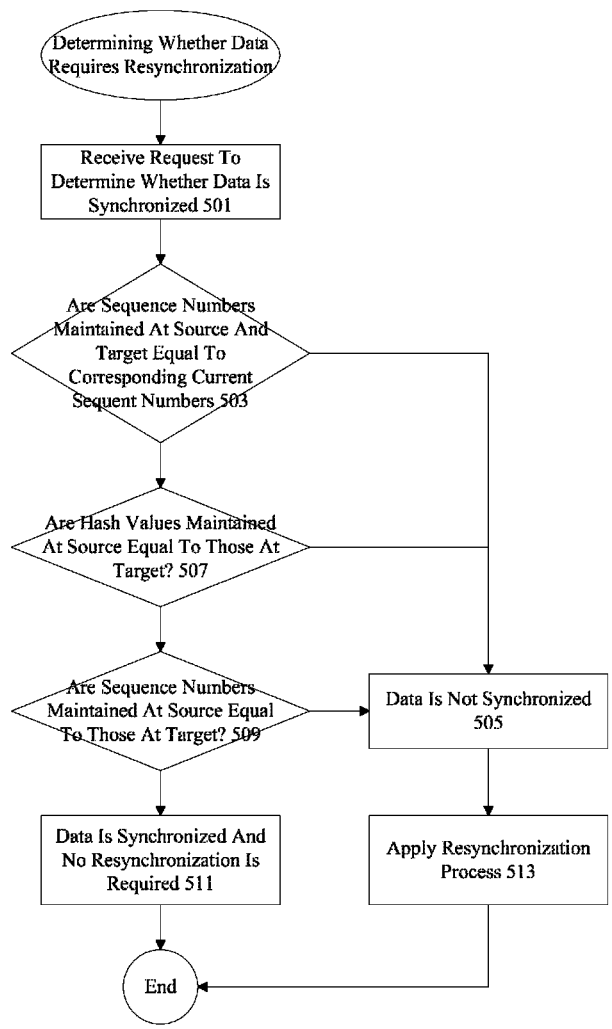
FIG. 5 illustrates a particular example of a technique for determining whether data requires resynchronization.

FIG. 5 illustrates a particular example of a technique for determining whether data requires resynchronization. At 501, a request is received to determine whether data is synchronized between a source node and a target node. According to various embodiments, the request may be received after a link is temporarily offline, disk errors are detected, or separate processing has occurred at a particular node. At 503, it is determined if the sequence number maintained at a source node is equal to the current sequence number at the source node and whether the sequence number maintained at the target node is equal to the current sequence number at the target node. The sequence number checking essentially identifies whether any changes have been made since the last replication process. If the sequence numbers do not match, the data is out of sync at 505. If the sequence numbers match, it is determined at 507 whether the hash value maintained at the source node in the sequence number and hash tuple is equal to the hash value maintained in the sequence number and hash tuple at the target node. If the hash values do not match, data is out of sync at 505.

If the hash values match, it is determined at 509 whether the sequence number maintained at the source node in the sequence number and hash tuple is equal to the sequence number maintained in the sequence number and hash tuple at the target node. If the sequence numbers do not match, data is out of sync at 505. Otherwise, the data is in sync and no resynchronization is required at 511. If data is out of sync at 505, a resynchronization process such as a new replication process occurs at 513. Data at the source node or at the target node need not be read and analyzed in order to determine whether data is synchronized.

A variety of devices and applications can implement particular examples of the present invention. FIG. 6 illustrates one example of a computer system. According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   determining an initial data tuple for a chunk of data during replication of the chunk of data from a source node to a target node, the initial data tuple comprising an initial sequence number and an initial hash value, the initial sequence number indicating a number of times the chunk of data has been modified, the initial hash value comprising the result of applying a hash function to the chunk of data;
   transmitting the initial data tuple for the chunk of data to the target node;
   maintaining the initial data tuple at both the source node and the target node thereby forming a maintained source data tuple and a maintained target data tuple, wherein the maintained source data tuple includes a maintained source hash value and a maintained source sequence number corresponding to the initial sequence number, and wherein the maintained target data tuple includes a maintained target hash value and a maintained target sequence number corresponding to the initial sequence number;
   receiving a request to determine whether data corresponding to the chunk at the source node is synchronized with the data corresponding to the chunk at the target node, the request corresponding to the maintained source data tuple and the maintained target data tuple;
   determining whether the data at the source node is synchronized with the data at the target node by comparing a current source sequence number, separate from the maintained source sequence number, at the source node to the maintained source sequence number at the source node to indicate whether the data chunk has been modified at the source node, by comparing a current target sequence number, separate from the maintained target sequence number, at the target node to the maintained target sequence number at the target node to determine whether the data chunk has been modified at the target node, and by comparing the maintained source data tuple at the source node to the maintained target data tuple at the target node to determine if the data chunk is out-of-sync, wherein the current source sequence number is separate from the current target sequence number; and performing resynchronization if the data at the source node is determined to not be synchronized with the data at the target node.

2. The method of claim 1, wherein the source node is an active node and the target node is a standby node.

3. The method of claim 1, wherein the initial sequence number and the initial hash value are maintained in extended attributes associated with the chunk.

4. The method of claim 3, wherein the chunk is a file.

5. The method of claim 1, wherein if any of the sequence numbers do not match, the data is not synchronized and a resynchronization operation is applied.

6. The method of claim 1, wherein if the current source and maintained source sequence numbers do match or if the current target and maintained target sequence numbers do match, it is determined whether the maintained source hash value is equal to the maintained target hash value.

7. The method of claim 6, wherein if the maintained source and maintained target hash values do not match, the data is not synchronized and a resynchronization operation is applied.

8. The method of claim 6, wherein if the maintained source and maintained target hash values do match, it is determined whether the maintained source sequence number is equal to the maintained target sequence number.

9. The method of claim 8, wherein if any of the aforementioned sequence numbers do not match, the data is not synchronized and a resynchronization operation is applied.

10. The method of claim 8, wherein if all of the aforementioned sequence numbers and all of the aforementioned hash values do match, the data is in sync and no resynchronization is required.

11. The method of claim 1, wherein data is determined to be synchronized by using the following algorithm:

is_data_insync( )
begin
if (primary.hashtuple.seqnum==primary.current_seqnum &&secondary.hashtuple.seqnum==secondary.current_seqnum && primary.hashtuple.hash==secondary.hashtuple.hash && primary.hashtuple.seqnum==secondary.hashtuple.seqnum)
begin return in-sync;
end
return out-of-sync;
end.

12. The method of claim 1, wherein the maintained source sequence number is stored in a datastore suitcase.

13. The method of claim 12, wherein the datastore suitcase includes an index portion and a data portion.

14. The method of claim 13, wherein the index portion includes indices, data offsets, and data reference counts.

15. The method of claim 14, wherein the data portion includes indices, data, and last file references.

16. A source node, comprising:
a processor configured to determine an initial data tuple for a chunk of data during replication of the chunk of data from a source node to a target node, the initial data tuple comprising an initial sequence number and an initial hash value, the initial sequence number indicating a number of times the chunk of data has been modified, the initial hash value comprising the result of applying a hash function to the chunk of data;

an interface configured to transmit the initial data tuple for the chunk of data to the target node;

memory configured to maintain the initial data tuple thereby forming a maintained source data tuple, wherein the maintained source data tuple includes a maintained source hash value and a maintained source sequence number corresponding to the initial sequence number;

wherein the interface is operable to receive request to determine whether data corresponding to the chunk at the source node is synchronized with the data corresponding to the chunk at the target node, wherein the request corresponds to the maintained source data tuple and the maintained target data tuple, wherein the request indicates that a current target sequence number at the target node has been compared to a maintained target sequence number at the target node to determine whether the data chunk has been modified at the target node, and wherein the processor is operable to determine whether the data at the source node is synchronized with the data at the target node by comparing a current source sequence number at the source node to the maintained source sequence number at the source node to indicate whether the data chunk has been modified at the source node and by comparing the maintained source data tuple at the source node to a maintained target data tuple at the target node to determine if the data chunk is out-of-sync, wherein the current target sequence number is separate from the current source sequence number; and wherein the processor is further operable to perform resynchronization if the data at the source node is determined to not be synchronized with the data at the target node.

17. The source node of claim 16, wherein the source node is an active node and the target node is a standby node.

18. The source node of claim 16, wherein the initial sequence number and the initial hash value are maintained in extended attributes associated with the chunk.

19. The source node of claim 18, wherein the chunk is a file.

20. A non-transitory computer readable storage medium, comprising:

computer code for determining an initial data tuple for a chunk of data during replication of the chunk of data from a source node to a target node, the initial data tuple comprising an initial sequence number and an initial hash value, the initial sequence number indicating a number of times the chunk of data has been modified, the initial hash value comprising the result of applying a hash function to the chunk of data;

computer code for transmitting the initial data tuple for the chunk of data to the target node;

computer code for maintaining the initial data tuple at both the source node and the target node thereby forming a maintained source data tuple and a maintained target data tuple, wherein the maintained source data tuple includes a maintained source hash value and a maintained source sequence number corresponding to the initial sequence number, and wherein the maintained target data tuple includes a maintained target hash value and a maintained target sequence number corresponding to the initial sequence number;

computer code for receiving a request to determine whether data corresponding to the chunk at the source node is synchronized with the data corresponding to the chunk at the target node, the request corresponding to the maintained source data tuple and the maintained target data tuple;

computer code for determining whether the data at the source node is synchronized with the data at the target node by comparing a current source sequence number, separate from the maintained source sequence number, at the source node to the maintained source sequence number at the source node to indicate whether the data chunk has been modified at the source node, by comparing a current target sequence number, separate from the maintained target sequence number, at the target node to the maintained target sequence number at the target node to determine whether the data chunk has been modified at the target node, and by comparing the maintained source data tuple at the source node to the maintained target data tuple at the target node to determine if the data chunk is out-of-sync, wherein the current source sequence number is separate from the current target sequence number; and computer code for performing resynchronization if the data at the source node is determined to not be synchronized with the data at the target node.

* * * * *